United States Patent [19] [11] 3,883,453
Takahashi et al. [45] May 13, 1975

[54] COATING COMPOSITIONS CONTAINING ACRYLIC POLYMERS POLYMERIZED IN THE PRESENCE OF CELLULOSE ACETATE BUTYRATE

[75] Inventors: Masao Takahashi; Tadanori Fukuda; Tosirou Kataoka, all of Otsu, Japan

[73] Assignee: Toray Industries, Inc., Tokyo, Japan

[22] Filed: May 10, 1973

[21] Appl. No.: 358,855

[52] U.S. Cl. .................................. 260/15; 260/17 A
[51] Int. Cl. ......................................... C08b 21/08
[58] Field of Search ......................... 260/15, 17 A

[56] References Cited
UNITED STATES PATENTS

| | | | |
|---|---|---|---|
| 2,839,479 | 6/1958 | Caldwell et al. | 260/17 |
| 3,657,001 | 4/1972 | Parker | 260/15 |
| 3,671,293 | 6/1972 | Walle | 117/74 |

OTHER PUBLICATIONS

Chem. Absts., Vol. 65; 1966; 10691f, "Polymerization of Ethylenically Unsaturated Monomers," Caldwell et al.

Primary Examiner—Morris Liebman
Assistant Examiner—Edward Woodberry

[57] ABSTRACT

Coating composition containing (A) 60 – 90 percent of a copolymer of mixed alkyl esters of acrylic or methacrylic acid or mixtures thereof in a cellulose acetate butyrate solution in the presence of peroxide catalyst, and (B) 10 – 40 percent amino resin.

6 Claims, No Drawings

COATING COMPOSITIONS CONTAINING ACRYLIC POLYMERS POLYMERIZED IN THE PRESENCE OF CELLULOSE ACETATE BUTYRATE

BACKGROUND OF THE INVENTION

This invention relates to coating compositions having improved application characteristics.

Market requirements for high performance coatings and paints have recently become more stringent. Improved film properties and spray characteristics, rationalized spraying processes and avoidance of infringement of environmental solvent pollution laws, such as so-called "Rule 66", are being expected or required more and more.

This invention relates to coating compositions for preparing superior metallic paint compositions having improved metallic appearance, gloss and mirror-like qualities, and improved spray application characteristics as well.

SUMMARY OF THE INVENTION

The coating compositions of this invention are obtained by polymerizing mixtures of various monomers selected from the group consisting of alkyl acrylate, alkyl methacrylate and other monomers which are copolymerizable with acrylic monomers in cellulose acetate butyrate (hereinafter called CAB) solution, wherein the alkyl groups of the acrylate or methacrylate have from 1 to 20 carbon atoms, and an amino resin. The proportion of amino resin in the polymer components is about 10% to 40% by weight. The CAB which can be used in the practice of this invention may contain various amounts of acetyl, butyryl and hydroxyl groups in which the proportions of these groups are widely variable. Usually, the proportions of acetyl, butyryl and hydroxyl groups are about 1 to 30%, 17 to 55% and 0 to 5% by weight respectively. Preferably, the proportions of acetyl, butyryl and hydroxyl groups are about 2 to 14%, 37 to 53% and 0.5 to 3% by weight respectively and the viscosity of the CAB (measured by ASTM Method D-871-48) is 0.1 to 2 seconds.

A wide range of solvents can be used depending upon the variables applicable to the esters, i.e. butyryl content, acetyl content and hydroxyl content.

For instance, preferred solvents for a type of CAB containing 50% butyryl group and 6% acetyl group can be acetone, methyl ethyl ketone, methylene chloride, ethyl acetate, methyl acetate, isopropyl acetate, methyl isoamyl ketone, butyl acetate, nitropropane, cyclohexanone, diacetone alcohol, 80/16/64 methyl isoamyl ketone/ethyl alcohol/toluene, 30/10/60 ethyl acetate/ethyl alcohol/toluene. Preferred solvents for one type of CAB containing 26% butyryl group and 21% acetyl group can be acetone, ethyl acetate, methyl ethyl ketone, nitroethane, cyclohexanone, methyl isobutyl ketone, diacetone alcohol, butyl acetate, methylene chloride, ethylene chloride, 20/10/50/20 isobutyl acetate/cellosolve acetate/toluene/ethyl alcohol, 35/52/13 acetone/toluene/ethyl alcohol.

The content of CAB in the solution is determined by considering the appropriate proportion of CAB in the coating compositions and is preferably in the range of 2 to 30%. More preferably, values between 3 and 15% are used.

Suitable peroxide polymerization catalysts include t-butyl peroxy pivalate, octanoyl peroxide, lauroyl peroxide, stearoyl peroxide, propionyl peroxide, succinic acid peroxide, acetyl peroxide, t-butyl peroxy-2-ethylhexanoate, benzoyl peroxide, t-butyl peroxy isobutyrate, t-butyl peroxy maleic acid, t-butyl peroxy laurate, cyclohexanone peroxide, t-butyl peroxy isopropyl carbonate, 2,5-dimethyl-2,5-di(benzoyl peroxy) hexane, t-butyl peroxy acetate, t-butyl peroxy benzoate, methyl ethyl ketone peroxide, dicumyl peroxide, t-butyl hydroperoxide and di-t-butyl peroxide.

The catalyst may be used in a proportion within the range of from about 0.1 to 10% by weight of the monomer and preferred proportions are within the range of from 0.5 to 5% by weight of the monomer.

The polymerization reaction of the monomer mixture in said CAB solution may be carried out in one or more stages.

Suitable $C_1$ to $C_{20}$ alkyl esters of acrylic acid and methacrylic acid are methyl, ethyl, propyl, butyl, isobutyl, ter-butyl, octyl, 2-ethyl-hexyl, lauryl, tridecyl, stearyl and cyclohexyl esters.

The appropriate proportion of the above described esters of acrylic acid and methacrylic acid to CAB is not critical and is widely variable, but is between about 50 and 2, and preferably within the range of about 30 to 3, percent by weight.

The applicable polymerization temperature depends upon the types of catalysts and solvents used; it may be in the range of about 50°C to 200°C, and preferably about 60°C to 150°C.

In this invention, the monomer mixture comprising alkyl acrylate or alkyl methacrylate as the main component, may consist of about 30–96%, preferably about 50–90% of alkyl acrylate or alkyl methacrylate having about 1 to 20 carbon atoms in the alkyl group and about 70–4%, preferably about 50–10% of other monomers such as acrylic acid, acrylamide, hydroxyethyl acrylate, methylol acrylamide, butoxymethyl acrylamide, methacrylic acid, methacryl amide, hydroxyethyl methacrylate, hydroxypropyl methacrylate, methylol methacrylamide and butoxymethyl methacrylate. More preferably, a mixture comprising:

1. about 60–90% of alkyl acrylate or methacrylate having from about 1 to 18 carbon atoms in the alkyl group,
2. about 4–25% of hydroxyalkyl acrylate or methacrylate having from about 2 to 20 carbon atoms in the alkyl group, and
3. about 0.3–5% of $\alpha,\beta$ ethylenic unsaturated carboxylic acid of about 3 to 8 carbon atoms can be used.

In this composition, preferred hydroxyalkyl acrylates and methacrylates are those wherein the alkyl group contains 2 to 12 carbon atoms, for example, hydroxyethyl, 2-hydroxypropyl, 3-hydroxypropyl, 4-hydroxybutyl, 5-hydroxyamyl, 6-hydroxyhexyl, 7-hydroxyheptyl, 8-hydroxyoctyl, 9-hydroxynonyl and 10-hydroxydecyl acrylate and methacrylate. The alkyl group can contain other substituents such as hydroxyl, halide and nitrile groups. Preferred $\alpha,\beta$-unsaturated carboxylic acids containing 3 to 8 carbon atoms include acrylic acid, methacrylic acid, itaconic acid, maleic acid, fumaric acid, crotonic acid and butene tricarboxylic acid.

In this preferred composition, if the content of hydroxyalkyl acrylate and methacrylate is less than 4%, the finished coated film is somewhat lacking in chemical resistance, solvent resistance and gasoline resistance. When more than 25% hydroxyalkyl acrylate and methacrylate is used, the resulting film lacks hot water resistance, acid resistance and alkali resistance. If the content of unsaturated carboxylic acid is less than 0.3%, the finished film is softer than desired and therefore lacks solvent resistance and chemical resistance. When more than 5% unsaturated carboxylic acid is used, the resulting film gives improved solvent and chemical resistance, but lacks smoothness and gloss and has a thin appearance. These latter are important characteristics in metallic paints. In many cases, 95 to 20%, preferably 90 to 70% thermosetting acrylic polymer of melamine-curable type can be combined with 5 to 80%, preferably 10 to 30% of the polymer composition of CAB/acrylic system, where the expression "melamine-curable thermosetting acrylic polymer" means a polymer containing reactive groups such as hydroxyl, carboxylic, epoxy or methylolamide being able to cure with melamine resin at elevated temperature and the polymer can be prepared by polymerizing an acrylic or methacrylic monomer mixture either in a certain solvent or in a solution comprising the component A of this invention. Preferably the acrylic or methacrylic monomer mixtures are prepared by selecting from the following monomers: acrylic acid, methyl acrylate, ethyl acrylate, butyl acrylate, ethylhexyl acrylate, acrylamide, hydroxyethyl acrylate, methylol acrylamide, butoxyethyl acrylamide, methacrylic acid, methyl methacrylate, butyl methacrylate, iso-butyl methacrylate, ethylhexyl methacrylate, methacrylamide, hydroxyethyl methacrylate, hydroxypropyl methacrylate, methylol methacrylamide, or butoxyethyl methacrylamide.

In this invention, amino resins such as urea-formaldehyde condensates consisting preferably of urea, thiourea, N,N'-dimethylurea, N, N'-diethyl urea, 1,2-propyleneurea, 1,3-propyreneurea, di-, tri-, tetra-, penta- and hexa- methylol melamine derivatives, trimethylol guanamine and dimethylol succinic amide can be combined with the polymer. About 10 to 40% of the amino resin is preferably combined with 90 to 60% of the polymer of this invention. These amino resins include alkylated condensates which can usually be prepared in the presence of alcohols containing less than 4 carbon atoms. A more preferred amino resin is butoxy methylated melamine. The addition of the amino resin largely affects the cross-linking density of the cured film, resulting in improved hardness and chemical resistance. If less than 10% of the amino resin is used, the cured film is somewhat lacking in hardness and chemical resistance. Normally, no more than about 40% amino resin is employed since when higher amounts are used, the resulting cured film is more brittle than desired and also lacks durability properties and acid resistance. Generally the amounts of amino resin are about 10 to 40%, and more preferably about 20 to 30%. This range yields the most desirable results.

Aluminum pigments may be added in accordance with this invention for creation of metallic paints. These are preferably flaky particles, and about 1 to 20%, preferably about 1.5 to 10% of such particles, based upon the total composition are added.

The coating composition of this invention is especially suitable for metallic coating and paint compositions, and a wide variety of pigments can be of course used for coloring the composition. Illustrative of such pigments are titanium dioxide, chromium yellow, procyan blue, barium titanate, zinc sulfide, lithopane, calcium sulfate, barium sulfate, zinc oxide and various organic pigments.

A wide variety of other resins such as epoxy, phenolic and vinyl resins and other additives can also be incorporated into the compositions of this invention.

These compositions can be applied as coatings by various coating methods such as flow coating, roller coating, curtain flow coating and spray coating, for example. In particular, spray coating is most suitable.

The coated film, having the desired film thickness on the object to be coated, should be usually cured by heating. The optimum heat curing procedure depends upon such factors as amount of reactive groups in the composition, film thickness and solvent type, and usually a temperature between about 80°C to 300°C is found suitable. More preferably, the temperature should be in the range of about 100°C to 180°C.

Properties of particular value, achieved by this invention, include the following:

A. Dispersion type coating compositions in non-aqueous media can be obtained. Although both the CAB and the acrylic component are soluble in the solvent which is a component of this invention when they are dissolved separately in the solvent, dispersion type opaque compositions can be obtained by means of this invention.

B. Improved latitude in conditions of application, especially with metallic finishes, can be achieved. This composition achieves an excellent metallic finish which is easy to control to avoid defective application, and which allows more latitude to the spray operators as well as less dependence on their skill. Spray operation by means of automatic electrostatic spray guns has become possible with this composition.

C. Higher coating build-up can be achieved. Improved fine particles and higher build-up at spray operation can be achieved and excellent sag resistance can also be obtained.

D. Improved solvent pop resistance can be achieved. Solvent release after spraying, i.e. during setting and curing operations, is faster than conventional type compositions, which result in improved solvent pop resistance. Indeed, such resistance is about twice that of conventional types. Specifically, the limiting thickness without solvent pop or pinholes for this composition is about $80\mu$, whereas only $30\mu$ to $40\mu$ were permissible for conventional type paints.

E. Faster set-up gives reduced dirt pick-up problems.

F. Higher level of gloss, flow and mirrow-like appearance of finish can be obtained.

G. Higher solid contents during spraying operations can be obtained, resulting in the use of a lesser amount of thinner, due to the favorable viscosity-concentration relationship. This leads to a favorable situation with respect to anti-pollution restrictions.

The following examples are illustrative of this invention:

EXAMPLE 1

6 parts of cellulose acetate butyrate (EAB 551 - 0.2) (Registered Trademark of Eastman Kodak Co.) were dissolved in a mixture of the following solvents:

| | |
|---|---|
| Ethylacetate | 60 parts |
| Cellosolve acetate | 40 parts |

The solution was charged into a vessel equipped with a stirrer and a reflux condenser.

This solution was heated to 95°C and then the following mixture was dripped in at a constant rate over a period of 2 hours while maintaining the solution under an atmosphere of nitrogen:

| | |
|---|---|
| Styrene | 12 parts |
| Butylacrylate | 40 parts |
| Lauryl methacrylate | 23 parts |
| Hydroxypropyl methacrylate | 17 parts |
| Acrylic acid | 2 parts |
| Benzoyl peroxide | 2 parts |

This mixture was maintained at 95°C for 3 hours, and then 0.5 part of benzoyl peroxide was added 3 times at intervals of 1 hour, and after that the mixture was held for a further 2 hours. The resulting varnish was a slightly whitened dispersion and its Gardner viscosity was W at 25°C.

A pigment paste was made by using a mixer to disperse the following:

| | |
|---|---|
| Resulting varnish | 80 parts |
| "Superbeckamine G-821"[1](50%) | 20 parts |
| Aluminium paste (70%) | 6 parts |

[1]Registered Trademark of Dainippon Ink Chemical Industrial Co. for a solution of butoxymethyl melamine.

This mixture was diluted with a thinner composed of 80 parts of xylene and 20 parts of cellosolve acetate to be settled to 15 sec. (Ford Cup No. 4). The total solids content was 29%. This diluted composition was sprayed onto a tin panel to give a smooth film at a dry film thickness of 30μ. Panels that were thus coated were allowed to stand for 10 minutes and then heated to 140°C for half an hour. The resulting film was free from sags and solvent-popping and had excellent working properties for metallic finishes, and a uniform high gloss, a mirror-like appearance and had the feel of a thicker film.

EXAMPLE 2

6 parts of cellulose acetate butylate EAB 381-05 were dissolved in a mixture of the following solvents:

| | |
|---|---|
| Xylene | 80 parts |
| Iso-butanol | 20 parts |

This solution was heated to 95°C and then the following mixture was dripped in at a constant rate over a period of 2 hours under an atmosphere of nitrogen:

| | |
|---|---|
| Laurylmethacrylate | 45 parts |
| Iso-butyl methacrylate | 35 parts |
| Hydroxymethacrylate | 12 parts |
| Acrylic acid | 2 parts |
| Benzoyl peroxide | 2 parts |

This mixture was held at 95°C for 3 hours and then 0.5 parts of benzoyl peroxide was added to the mixture 3 times at intervals of 1 hour. After that, the mixture was heated for 5 hours. The resulting varnish was a whitened dispersion and its Gardner viscosity was X at 25°C.

A pigment paste was made by dispersing the following mixture, using a mechanical mixer.

| | |
|---|---|
| Varnish | 70 parts |
| EAB 381-05 | 10 parts |
| "Superbeckamine G-821" (50%) | 20 parts |
| Aluminum paste (70%) | 4 parts |
| Phthalocyanine blue | 1 part |

This enamel was diluted before application with the following solvent to yield a spray viscosity of 14 sec., Ford Cup No. 4:

| | |
|---|---|
| Ethyl acetate | 40 parts |
| Toluene | 20 parts |
| Naphtha No. 5 | 20 parts |
| Cellosolve acetate | 20 parts |

The total solids content of the enamel was 29%. This diluted composition was sprayed onto a phosphated steel panel to give a smooth film at a dry film thickness of 40μ. The coatings were air-dried for 8 minutes and then stored for 30 minutes at 140°C. The resulting film was free from sags and solvent popping and had an excellent and uniform high gloss, mirror-like appearance and had the feeling of a thicker film.

EXAMPLE 3

15 parts of cellulose acetate butylate EAB 381-0.5 were dissolved in a mixture of the following solvents:

| | |
|---|---|
| Toluene | 70 parts |
| Iso-butanol | 30 parts |

This solution was heated to 90°C and then the following mixture was dripped in for a period of 2 hours:

| | |
|---|---|
| Styrene | 20 parts |
| Lauryl methacrylate | 20 parts |
| Methyl methacrylate | 10 parts |
| Butylacrylate | 20 parts |
| Hydroxypropylacrylate | 14 parts |
| Methacrylic acid | 1.5 parts |
| Benzoyl peroxide | 2.0 parts |

This mixture was held for 4 hours at 90°C, and then 0.5 parts of benzoyl peroxide was added twice at intervals of 2 hours, after that the mixture was heated for 5 hours. The resulting varnish was a whitened dispersion and its Gardner viscosity was $Z_1$ at 25°C.

The resulting varnish was pigmented by dispersing the following mixture using a mechanical mixer.

| | |
|---|---|
| Varnish prepared as described | 80 parts |
| "Yuban 20SE"[1] (50%) | 20 parts |
| Aluminum paste (70%) | 5 parts |

[1]Registered Trademark of Mituitsatu Co. for a solution of butoxy methylmelamine.

This enamel was diluted with a mixture of xylene and cellosolve acetate (80/20) until it was in the region of 16 seconds spray viscosity (Ford Cup No. 4). The solids content was 28%. This diluted composition was sprayed onto a thin panel to give a smooth film at a dry film thickness of 40μ. The coatings were air-dried for 10 minutes and then cured for 30 minutes at 140°C. The resulting film was free from sags and solvent popping. It had excellent working properties for metallic finishes, had a mirror-like appearance and felt like thicker film.

EXAMPLE 4

5.3 parts of cellulose acetate butyrate EAB 551-0.2 were dissolved in a mixture of the following solvents:

| | |
|---|---|
| Cellosolve acetate | 20 parts |
| Ethylacetate | 80 parts |

The following mixture was added:

| | |
|---|---|
| Stearyl methacrylate | 21.0 parts |
| Hydroxypropylmethacrylate | 2.6 parts |
| Benzoylperoxide | 0.44 parts |

This charge was heated to reflux temperature (approximately 85°C), causing copolymerization, and this temperature was held for about 5 hours. After that, the temperature was raised to 90°C and the following mixture of monomers and catalyst was dripped in over a period of 2 hours:

| | |
|---|---|
| Styrene | 13 parts |
| Butylmethacrylate | 27 parts |
| Butylacrylate | 14 parts |
| Hydroxypropylmethacrylate | 13 parts |
| Acrylic acid | 1 part |
| Azobisisobutyronitrile | 0.9 part |

This mixture was then heated for a further hour under the same conditions and 0.5 part of azobisisobutyronitrile was added and the mixture was heated for 2 hours to ensure complete reaction. The product was a whitened dispersion and its Gardner viscosity was S~T at 30°C.

A pigment paste was made by dispersing the mixture of 80 parts of the product, 20 parts of "Superbeckamine G-821" (50%) and 3 parts of aluminum paste (70%), using a mechanical mixer. The resulting enamel was diluted with the following thinner:

| | |
|---|---|
| Acetone | 10 parts |
| Ethylacetate | 40 parts |
| Toluene | 15 parts |
| Naphtha No. 5 | 15 parts |
| Cellosolve acetate | 20 parts | until it was in the region of 16 seconds spray viscosity (Ford Cup No. 4). The solids content of this enamel was 27%. The diluted composition was sprayed on a thin panel to give a smooth film at a dry film thickness of 30μ. The coatings were air-dried for 10 minutes and then cured for 30 minutes at 140°C. The resulting film was free from sags and solvent popping and had excellent working properties for metallic finishes, had a mirror-like appearance and felt like a thicker film.

EXAMPLE 5

6 parts of cellulose acetate butyrate EAB 550 were dissolved in a mixture of the following solvents:

| | |
|---|---|
| Cellosolve acetate | 40 parts |
| Butanol | 60 parts |

The following first stage mixture was added:

| | |
|---|---|
| Isodecylmethacrylate | 15.0 parts |
| Hydroxypropylmethacrylate | 2.0 parts |
| Acrylic acid | 0.12 part |
| Benzoyl peroxide | 0.2 part |

This mixture was heated to approximately 90°C, to start the reaction. After 5 hours the following second stage mixture was dripped in at a constant rate over a period of 2 hours:

| | |
|---|---|
| Laurylmethacrylate | 23 parts |
| Methylmethacrylate | 28 parts |
| Butylmethacrylate | 25 parts |
| Hydroxyethylmethacrylate | 16 parts |
| Methacrylic acid | 1 part |
| Azobisisobutyronitrile | 0.9 part |

It was then held for 1 hour. Then 0.4 part of azobisisobutyronitrile was added and the mixture was heated for a further 2 hours.

The resulting varnish was a stable whitened dispersion and its Gardner viscosity was Q~R at 30°C. This dispersion was stored for 1 month at 50°C, and did not change at all in appearance or observable properties.

A pigment enamel was made by dispersing a mixture of 85 parts of the resulting varnish, 15 parts of butoxymethylmelamine and 4 parts of aluminum paste (70%), using a mechanical mixer. This enamel was diluted with a thinner comprising:

| | |
|---|---|
| Ethylacetate | 50 parts |
| Toluene | 25 parts |
| Naphtha No. 5 | 15 parts |
| Cellosolve acetate | 10 parts | to give a spray viscosity of 17 seconds (Ford Cup No. 4). The total solids content was 29%. This diluted composition was sprayed on a thin plate panel to give a smooth film having a dry film thickness of 30μ. This coating was air-dried for 10 minutes and then cured for 30 minutes at 140°C. The resulting film was free from sags and solvent popping, and was excellent in working properties for metallic finishes, and had a high gloss and felt-like a thicker film.

EXAMPLE 6

7 parts of cellulose acetate butyrate EAB 550 were dissolved in a mixture of the following solvent:

| | |
|---|---|
| Solvesso No. 150 | 70 parts |
| Butanol | 30 parts |

The following first stage mixture was added:

| | |
|---|---|
| Methacrylate (C in the alkyl group = 12~14) | 15 parts |
| Hydroxypropylmethacrylate | 2 parts |
| Lauroyl peroxide | 0.3 part |

This mixture was heated to approximately 85°C to start the reaction. After about 5 hours, the following second stage mixture was dripped in at a constant rate for 2 hours, and then the solution was held for 1 hour:

| | |
|---|---|
| 2-ethyl-hexylmethacrylate | 20 parts |
| Methylmethacrylate | 26 parts |

| | |
|---|---|
| Iso-butylmethacrylate | 20 parts |
| Hydroxypropylmethacrylate | 14 parts |
| Methacrylic acid | 1 part |
| Azobisisobutyronitrile | 0.8 part |

Then 0.4 part of azobisisobutyronitrile was added and the mixture was heated for a further period of 2 hours. The resulting varnish was a stable whitened dispersion and its Gardner viscosity was P~Q at 30°C. Though this dispersion was stored for 1 month at 50°C, it was so stable that no change occurred at all.

A pigment enamel was made by dispersing a mixture of 85 parts of the resulting varnish, 11 parts of butoxymethylmelamine, 4 parts of "Epicote 1001" (registered trademark of Shell Co. for an epoxide resin), 20 parts of rutile titanium dioxide and 4 parts of phthalocyanine blue with a mixer. After this enamel was diluted with thinner, the composition was sprayed on a phosphated steel panel ("Bonderite No. 37", thickness 0.28 mm) to give a smooth film at a dry film thickness of 30μ. This coating was air-dried for 10 minutes and then cured for 5 minutes at 240°C. The resulting film was free from sags and solvent popping, and had an excellent gloss.

Example 7

| | |
|---|---|
| Varnish obtained from Example 3 | 70 parts |
| "Superbeckamine G-821" (50%) | 20 parts |
| "Epicoat No. 1001" | 10 parts |
| Rutile titanium dioxide | 80 parts | were mixed with a roller mill to make a white enamel. This enamel was diluted with a thinner comprising:

| | |
|---|---|
| Xylene | 40 parts |
| Solvesso No. 100 | 20 parts |
| Solvesso No. 150 | 30 parts |
| Cellosolve acetate | 10 parts | to give a spray viscosity of 19 seconds (Ford Cup No. 4). The total solids content was 32%. This diluted composition was coated on a phosphated steel panel ("Bonderite No. 144", thickness 0.6 mm) to give a smooth panel at a dry film of 40μ. The coatings were air-dried for 15 minutes and then cured for 30 minutes at 160°C. The resulting film was free from sags and solvent popping, and was excellent in high gloss, had a mirror-like appearance and felt like a thicker film.

EXAMPLE 8

7 parts of cellulose acetate butyrate EAB 551-0.2 were dissolved in the following mixture:

| | | |
|---|---|---|
| Cellosolve acetate | 11 | parts |
| Ethylacetate | 22 | parts |
| The following first stage mixture was added: | | |
| Methacrylate (C in the alkyl group = 12~13) | 20 | parts |
| Hydroxypropylmethacrylate | 2.5 | parts |
| Benzoyl peroxide | 0.55 | part |

The mixture was heated to 85~90°C to start the reaction. After about 5 hours, a whitened dispersion was obtained.

On the other hand, the following mixture:

| | | |
|---|---|---|
| Styrene | 20 | parts |
| Butylmethacrylate | 24 | parts |
| Butylacrylate | 22 | parts |
| Hydroxypropylmethacrylate | 16 | parts |
| Acrylic acid | 1 | part |
| Azobisisobutyronitrile | 0.9 | part | was dripped into the following mixture and heated to 90°C at a constant rate over a period of 2 hours:

| | |
|---|---|
| Toluene | 70 parts |
| Iso-butanol | 30 parts |

After 1 hour, 0.2 parts of azobisisobutyronitrile were added three times at intervals of 1 hour, and the mixture was heated over a further period of 2 hours and then cooled.

The resulting varnish was blended with the dispersion obtained in the first stage. The final product became a whitened dispersion. Its Gardner viscosity was R-S at 30°C. Though this dispersion was stored for a month at 50°C, its storage stability was very good.

A pigment enamel was made by dispersing a mixture of 80 parts of the varnish, 20 parts of "Superbeckamine G-821", and 6 parts of aluminum paste (70%). This enamel was diluted with the following thinner:

| | |
|---|---|
| Acetone | 10 parts |
| Ethlacetate | 40 parts |
| Toluene | 15 parts |
| Naphtha No. 5 | 15 parts |
| Cellosolve acetate | 20 parts | to give spray viscosity of 16 second (Ford Cup No. 4). The total solids content of the product was 28%. This diluted composition was sprayed on a thin plate panel to give a smooth film at a dry film thickness of 30μ. The coating was air-dried for 10 minutes and then cured for 30 minutes at 140°C. The resulting film was free from sags and solvent popping, and was excellent in working properties for metallic finishes, had a mirror-like appearance and felt like a thicker film.

EXAMPLE 9

6 parts of cellulose acetate butyrate EAB 551-0.2 were dissolved in

| | |
|---|---|
| Toluol | 100 parts | and the following first stage mixture was added, and heated to 95~105°C:

| | |
|---|---|
| β-hydroxyethylmethacrylate | 15 parts |
| Acrylic acid | 0.1 part |
| Benzoyl peroxide | 0.3 part |

After about 3 hours, a whitened dispersion was obtained. Then the following second stage mixture was dripped in at a constant rate for a period of 2 hours:

| | |
|---|---|
| Methylmethacrylate | 25 parts |
| Iso-butylmethacrylate | 20 parts |
| Butylacrylate | 40 parts |
| β-hydroxypropylmethacrylate | 14 parts |
| Acrylic acid | 1 part |
| Azobisisobutyronitrile | 1.5 parts |

After 1 hour, 0.5 part of azobisisobutyronitrile was added and the mixture was heated for 2 hours, to ensure complete reaction.

The resulting varnish was a whitened dispersion and its Gardner viscosity was X at 30°C.

A pigment enamel was made by dispersing a mixture of 80 parts of the varnish, 20 parts of "Superbeckamine G-821" (50%) and 3 parts of aluminum paste (70%), using a mechanical mixer.

This enamel was diluted with the following thinner:
| | |
|---|---|
| Ethylacetate | 40 parts |
| Iso-butanol | 10 parts |
| Solvesso No. 100 | 25 parts |
| Solvesso No. 150 | 25 Parts | to give a spray viscosity of 14 seconds (Ford Cup No. 4). The diluted composition was sprayed on a phosphated steel panel to give a smooth film having a dry film thickness of 30μ. The coatings were air-dried for 10 minutes, and then cured for 30 minutes at 140°C. The resulting film had good gloss and was free from mottle and other surface imperfections.

What we claim is:

1. A coating composition comprising an intimate mixture of the following components A and B:
   A. about 60 – 90% by weight of a dispersion of copolymer obtained by copolymerizing a mixture of acrylic monomers which consist of
      a. about 30–96% by weight of at least one monomer selected from the group consisting of alkyl acrylate monomers and alkyl methacrylate monomers, wherein the alkyl groups have 1 – 20 carbon atoms, and
      b. about 70–4% by weight of at least one monomer selected from the group consisting of hydroxyalkyl acrylate monomers and hydroxyalkyl methacrylate monomers wherein the alkyl groups have 2–20 carbon atoms, an $\alpha,\beta$-ethylenically unsaturated carboxylic acid, acrylamide, methacrylamide, methylol acrylamide, methylol methacrylamide, butoxymethyl acrylamide, butoxymethyl methacrylamide, butoxymethyl acrylamide, and butoxyethyl methacrylamide in the presence of a solution of cellulose acetate butyrate with a peroxide catalyst, the proportion of component (a) to cellulose acetate butyrate being between about 50 and 2, and
   B. about 10 – 40% by weight of amino resin, wherein the cellulose acetate butyrate has about 53–37% by weight of butyryl content, about 2–14% by weight of acetyl content and about 0.5–3% by weight of hydroxyl content, and in which the content of cellulose acetate butyrate in the cellulose acetate butyrate solution is about 2–30% by weight.

2. A coating composition as claimed in claim 1 in which the mixtures of acrylic monomers comprises the following monomers:
   (I) about 60 – 90% by weight of a monomer selected from the group consisting of alkyl acrylate monomers and alkyl methacrylate monomers wherein the alkyl groups have 1–18 carbon atoms,
   (II) about 4 – 25% by weight of a member selected from the group consisting of a hydroxyalkyl acrylate, and a hydroxyalkyl methacrylate wherein the alkyl groups have 2–12 carbon atoms, and
   (III) about 0.3 – 5% by weight of an $\alpha,\beta$-ethylenically unsaturated carboxylic acid having 3 to 8 carbon atoms.

3. A coating composition as claimed in claim 1 in which the peroxide catalyst for the copolymerization is selected from the group consisting of t-butyl peroxy pivalate, octanoyl peroxide, lauroyl peroxide, stearoyl peroxide, propionyl peroxide, succinic acid peroxide, acetyl peroxide, t-butyl peroxy-2-ethyl-hexanoate, benzoyl peroxide, t-butyl peroxy iso-butyrate, t-butyl peroxy maleic acid, t-butyl peroxy laurate, cyclohexanone peroxide, t-butyl peroxy iso-propyl carbonate, 2, 5-dimethyl-2, 5-di (benzoyl peroxy) hexane, t-butyl peroxy acetate, t-butyl peroxy benzoate, methyl ethyl ketone peroxide, dicumyl peroxide, t-butyl hydroperoxide and di-t-butyl peroxide.

4. A coating composition as claimed in claim 1 in which solvent for the cellulose acetate butyrate is a solvent selected from the group consisting of cellosolve acetate, ethylacetate, methylethylketone, and alcohol having about 1∼6 carbon atoms.

5. A coating composition as claimed in claim 1 in which the amino resin is selected from the group consisting of hexamethylolmelamine, butoxymethylmelamine and methoxymethylmelamine.

6. A coating composition as claimed in claim 1 in which the ratios of the peroxide catalyst is 0.1 – 10% by weight to the total acrylic monomer.

* * * * *